(12) United States Patent
Harrison

(10) Patent No.: US 7,367,447 B1
(45) Date of Patent: May 6, 2008

(54) RODLESS MODULAR CONVEYOR BELT

(75) Inventor: James J. Harrison, Bernville, PA (US)

(73) Assignee: Habasit AG, Reinach-Basel (CH)

( * ) Notice: Subject to any disclaimer, the term of this patent is extended or adjusted under 35 U.S.C. 154(b) by 0 days.

(21) Appl. No.: 11/592,705

(22) Filed: Nov. 3, 2006
(Under 37 CFR 1.47)

(51) Int. Cl.
*B65G 17/06* (2006.01)

(52) U.S. Cl. .................................. 198/850

(58) Field of Classification Search ......... 198/850–853
See application file for complete search history.

(56) References Cited

U.S. PATENT DOCUMENTS

| | | | | |
|---|---|---|---|---|
| 3,127,980 A | * | 4/1964 | Lanham | 198/850 |
| 3,160,024 A | * | 12/1964 | Mojonnier | 474/212 |
| 4,394,901 A | * | 7/1983 | Roinestad | 198/850 |
| 5,174,439 A | * | 12/1992 | Spangler et al. | 198/853 |
| 5,181,601 A | | 1/1993 | Palmaer et al. | |
| 5,562,200 A | * | 10/1996 | Daringer | 198/844.2 |
| 5,645,160 A | | 7/1997 | Palmaer et al. | |
| 5,706,934 A | | 1/1998 | Palmaer et al. | |
| 6,439,378 B1 | * | 8/2002 | MacLachlan | 198/850 |
| 7,055,678 B2 | * | 6/2006 | Gundlach et al. | 198/851 |

* cited by examiner

*Primary Examiner*—Mark A Deuble
(74) *Attorney, Agent, or Firm*—Thomas M. Freiburger

(57) ABSTRACT

A conveyor belt assembled of modular plastic components is retained together without the usual connecting rods or pins. In one embodiment the modules, each of which has series of finger-like projections or knuckles both at forward and rear ends of the module, the projections are tapered to narrows in width from top to bottom. The projections at either the forward or rear side have laterally extending posts or dowels at one side of each projection, each with a length that extends through only part of the width of the gap between adjacent projections. In the opposite set of projections are holes, similar to the aligned holes that are present when module rows are connected by rods. With the projections being tapered, modules of adjacent rows can be put together by interdigiting the projections with the modules of adjacent rows held at an angle, preferably an acute angle beyond 90°. When the modules are brought back toward alignment to a common plane, the pivot posts of one module become locked in the holes of the module of the adjacent row.

20 Claims, 11 Drawing Sheets

FIG. 2
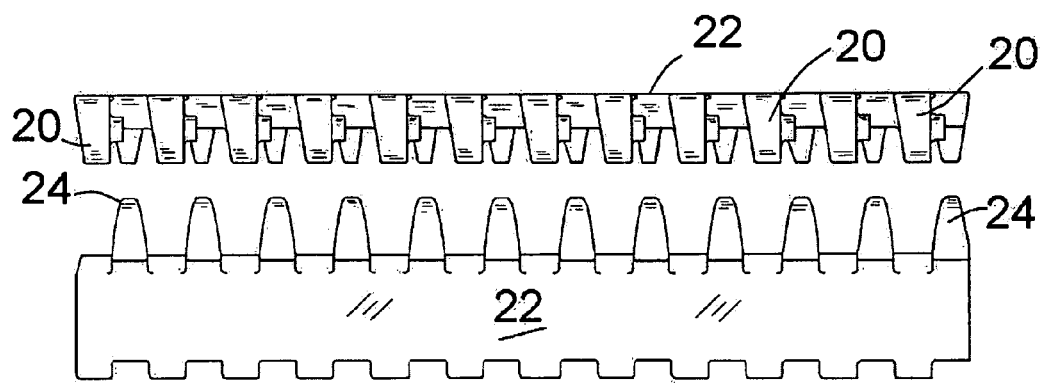
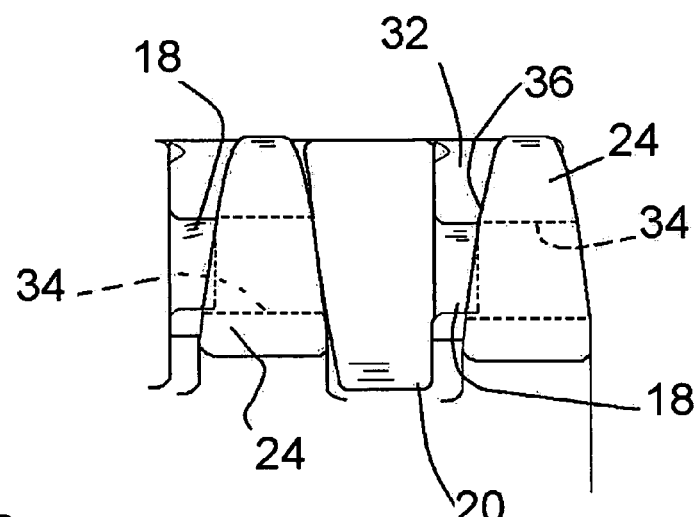
FIG. 3

RODLESS MODULAR CONVEYOR BELT

BACKGROUND OF THE INVENTION

This invention concerns modular conveyor belts formed of integrally molded plastic modules interfitted together to form belts of any desired length and a broad range of different widths. The invention more particularly relates to elimination of pins or rods that normally extend through interdigited knuckles or projections of adjacent rows of modules to retain the rows together to form the belt.

Conveyor belts of the general type with which this invention is concerned are shown in KVP U.S. Pat. Nos. 5,181,601, 5,645,160, and 5,706,934. In particular, one embodiment of the current invention relates to a configuration shown and described in U.S. Pat. No. 5,706,934.

All of the above patents show modular plastic conveyor belts wherein rods or pins, sometimes very long, extend through apertures in the interdigited knuckles or projections of modules of adjacent rows, to hold the adjacent rows together while allowing pivoting motion between the module rows, particularly to allow travel over a driving sprocket or roller. Connecting rods or pins contribute to the cost of the conveyor belt, are subject to wear, often unevenly along the pin, and must be retained in the belt against lateral movement and migration, as well as being removable when repair or replacement is needed.

A modular conveyor belt manufactured by Ashworth Bros., Inc. under the name PRESTOFLEX includes modules which snap together in serial relationship, with deflection of the plastic material providing for the snap-together connection. The structure of the connection is very different from the invention described below.

It is an objective of the current invention to eliminate connecting rods or pins in modular conveyor belts formed of module rows having a multiplicity of knuckles or projections extending forward and back, with a reliable, robust and easily operated structure.

SUMMARY OF THE INVENTION

In one embodiment, the belt of this invention has modules with tapered knuckles or projections at forward and rear sides of each module. These modules, similar to those of U.S. Pat. No. 5,706,934 referenced above, are for a non-radius belt that forms a solid or substantially closed upper surface for conveying products. The tapered configuration, with a wide top and a narrower bottom on each knuckle or projection, provides that the modules when in normal configuration of a continuous plane are very tight at the pivot joints, with only very small gaps, such that conveyed articles, even quite small, will not fall through the belt. However, at the back or underside of the belt the narrowed dimension of the tapered knuckles provides relatively wide open spaces between the knuckles for cleaning; also, the tapered shape tends to promote some self-cleaning of the hinge joint as the module rows pivotally shift in assumed angled positions relative to one another on a drive sprocket or roller drum.

Pursuant to the current invention, such a belt is modified to eliminate connecting rods at the hinge lines. Instead, the knuckles or projections at one side of the belt (forward or rear) include integral, laterally-projecting pivot posts or dowels that extend part-way through the gap between adjacent such knuckles. These are connectable in interdigited fashion with the projections or knuckles of the modules from an adjacent module row, such modules being with apertures or recesses to receive the pivot posts of the first module row. The modules of the two different rows can only be assembled together into interdigited relationship (or disassembled) when they are held at an angle relative to one another, e.g. about ninety degrees or more acute. In that position, the tapered shapes of the knuckles provide for some lateral spacing and lateral movement between the module rows, enabling the pivot posts to be positioned alongside the apertures and then extended into the apertures as the two module rows are brought back to the planar configuration.

In another embodiment, the projections are not tapered, but engagement is still made with the modules of adjacent rows held at a sharp angle. One set of projections again has pivot posts, while the other has slots into which the posts can be inserted and, by rotation of the modules of adjacent rows, locked into position when the adjacent modules are rotated to planar relationship.

In the second embodiment, the slotted recesses in the second set of knuckles preferably curve upwardly toward the end of the module along the side of the knuckle, from the open end of the slot at the bottom of the knuckle up to an upper position at the level of the pivot posts in the other or first set of knuckles.

In a preferred embodiment the pivot posts extend into the slots a minimum of about 0.10", even when the adjacent modules are maximally shifted laterally in the direction away from post insertion, due to the tolerances in manufacture and the resulting "give" for slight lateral movement of the interdigited modules. The series of modules or module rows cannot separate because in the planar configuration of belt travel, the modules of succeeding rows butt nearly against each other, with the rounded projections of one module nearly in contact with a surface between projections on the next module. There's no opportunity in this configuration for the pivot posts to slide back down the slots, even if the belt ceases to be in tension. The succeeding modules are "locked" together unless and until an operator deliberately angles the adjacent module rows through an angle preferably more than ninety degrees, to an acute angular orientation, at which point the one module row can be released from the other.

With the slotted embodiment just described, the pivot posts or dowels preferably are present on both sides of each knuckle or projection, and the counterpart knuckles have their slots on both sides, for greater interengagement and greater tensile strength.

It is therefore among the objects of this invention to eliminate the need for connecting pins or rods in modular plastic conveyor belts, through provision of integral pivot posts that engage with apertures or slots in modules of a succeeding module row, the connection between the modules being made by deliberately angling the adjacent modules or module rows. These and other objects, advantages and features of the invention will be apparent from the following description of preferred embodiments, considered along with the accompanying drawings.

DESCRIPTION OF THE DRAWINGS

FIG. 2 is an exploded view showing an end view of one module and an angled view of an adjacent module to be assembled together with the one module, as part of a conveyor belt of the type shown in FIG. 1.

FIG. 3 is a close-up view showing a portion of the assembly after the two modules have been brought together from the position of FIG. 2.

DESCRIPTION OF PREFERRED EMBODIMENTS

Figure 1:
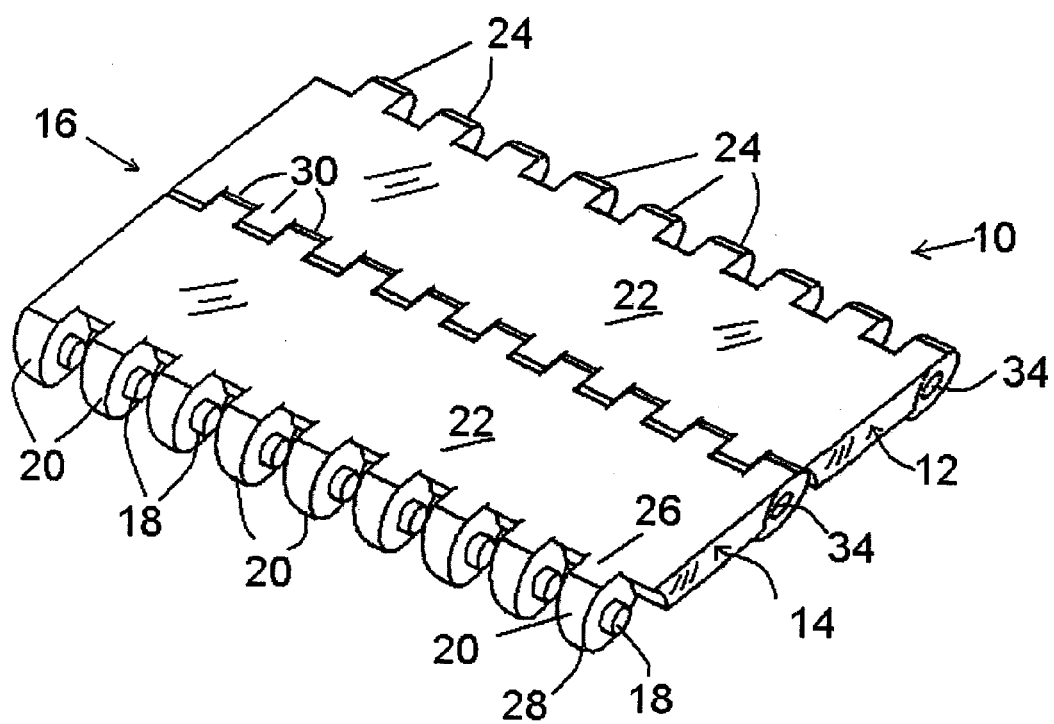
FIG. 1 is a perspective view showing the upper side of a portion of a conveyor belt employing the principles of the invention, in a first embodiment.

In the drawings, FIG. 1 shows in a first embodiment a portion of a belt 10 according to the invention, wherein adjacent modules 12 and 14, or module rows, are retained together along a hinge line 16 without connecting rods or pins. Connection between adjacent module rows is effected with pivot posts 18 which are integrally molded with the modules, extending laterally from projections or knuckles 20. These projections 20 extend as a set of essentially similar projections in one direction from a center section 22 of the module, and another group or set of projections 24 extend in the opposition direction, both along the line of the direction of travel. Herein and in the claims the term "first projections" is often applied to the projections 20, and the term "second projections" or "second set of projections" is often applied to the projections 24. However, this is not to imply any particular direction of travel; if there is a preferred direction of travel, either the projections 20 with the posts 18 or the projections 24 without such posts can extend forward in that direction. Similarly, the terms "fore and aft" or "forward and rearward" are merely used to differentiate the two ends of each module (relative to the direction of travel) and are not to be considered as limiting of the positions of the projections that include the posts 18.

Figure 4:
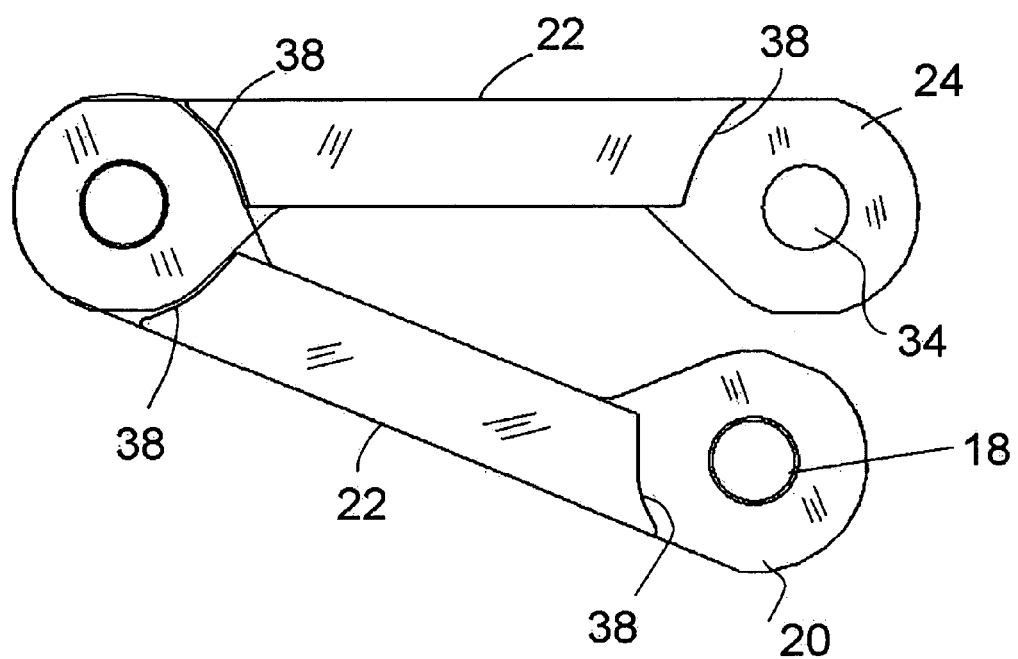
FIG. 4 is a side elevation view showing two modules or module rows which have been assembled together at an acutely angled orientation, prior to rotating the modules to a position in a common plane.

In this embodiment, the projections 20 and 24 are tapered in shape, wider at a top surface 26 and narrower at a bottom side 28. This is for reasons of a bottom-side open area and cleanability in solid top conveyor belt, as explained in U.S. Pat. No. 5,706,934, which is incorporated herein by reference. Due to the shape of the projections in this embodiment, the interdigited modules, even though leaving very small spaces 30 in the planar configuration wherein the module rows are essentially co-planar as shown in FIG. 1, afford considerable lateral movement when the adjacent module rows are folded together, to about ninety degrees or beyond, such as shown in FIGS. 2, 3 and 4. The angularity of the tapered projections, along with the narrow bottom end, comes into play such that the angled sides of the projections can be nested close together to provide a relatively large gap 32 between projections of the interdigited modules in this preferably acutely angled orientation, permitting some lateral shifting movement between the modules in this position.

The opposing projections or knuckles 24 on each module 22, as seen particularly in FIG. 1 and FIG. 4, have openings or recesses 34 within which the pivot posts 18 become seated when the adjacent module rows are assembled together. Although these recesses 34 could be relatively shallow, only extending a portion of the way through the projections 24, they are preferably through holes.

FIG. 2 shows one module 22 at an oblique angle, preferably rotated more than ninety degrees relative to an adjacent module 22 shown above, the two modules being in position to be assembled. The lower module 22 is pushed up into the interdigited position of the projections 20 and 24 as shown in FIG. 3, still in a sharply angled position relative to each other, preferably in an acute angle beyond ninety degrees from the normal planar configuration. In FIG. 3 (as in FIG. 2) the modules are held at a sufficiently sharp angle that the posts 18 have cleared the wall 36 of each of the projections 24 so as to be positioned adjacent to the aperture or recess 34 of each of the second set of projections 24. FIG. 4 also shows this acutely angled position of the two modules. This drawing also shows the preferably angled or rounded shape of the edges 38 of the center section 22 of each module, for better nesting together of adjacent modules and module rows so as to provide as closed and solid a top surface of the belt as possible.

From the position shown in FIGS. 3 and 4, the modules or module rows are turned back to the generally co-planar configuration as shown in FIG. 1. As soon as a certain position of angularity is reached, the pivot posts 18 become locked into the apertures or recesses 34, due to the closing of the gap between the interdigited projections as the two modules are rotated toward the co-planar position. Once the planar position of FIG. 1 is reached, the posts 18 extend at least about 0.06", at a minimum, more preferably at least about 0.08", into each recess, to provide adequate tensile strength in the belt.

Thus, the invention provides for simple and efficient assembly of module rows together, without the need for connecting pins. Although the invention is illustrated with a pair of modules that may in themselves form the width of the belt, it should be understood that a module row can be made up of one or several modules. Thus, a belt might be six inches or twelve inches in width, with a single module in each row, or it may be forty-eight inches in width or wider, made up, for example, modules of six inch width and twelve inch width, interleaved such that edge-to-edge joints between adjacent modules do not continue through more than a single row, a configuration sometimes known in the industry as "brick-laid".

Figure 5:
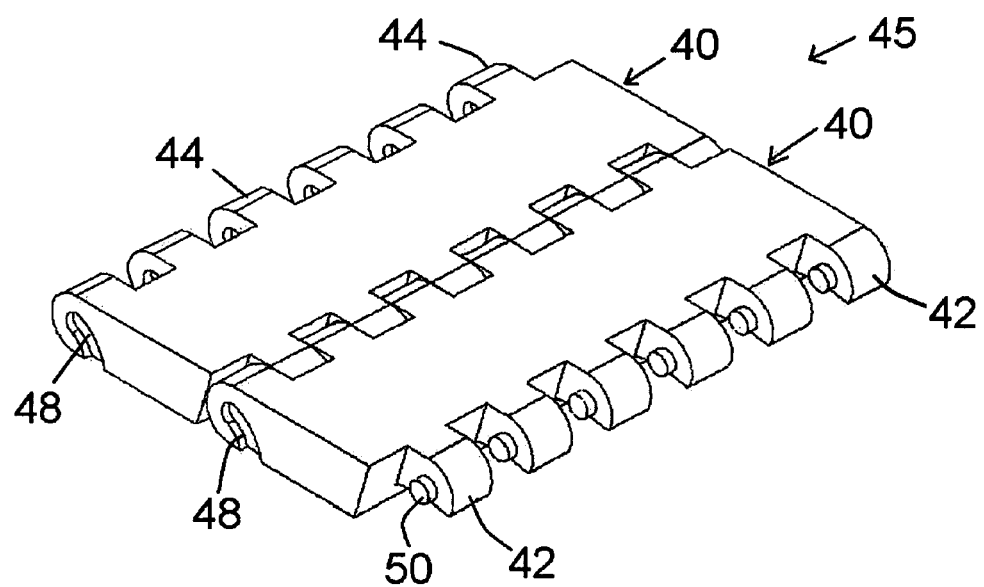
FIG. 5 is a perspective view showing the upper side of a portion of a modular conveyor belt according to a second embodiment of the invention.
Figure 6:
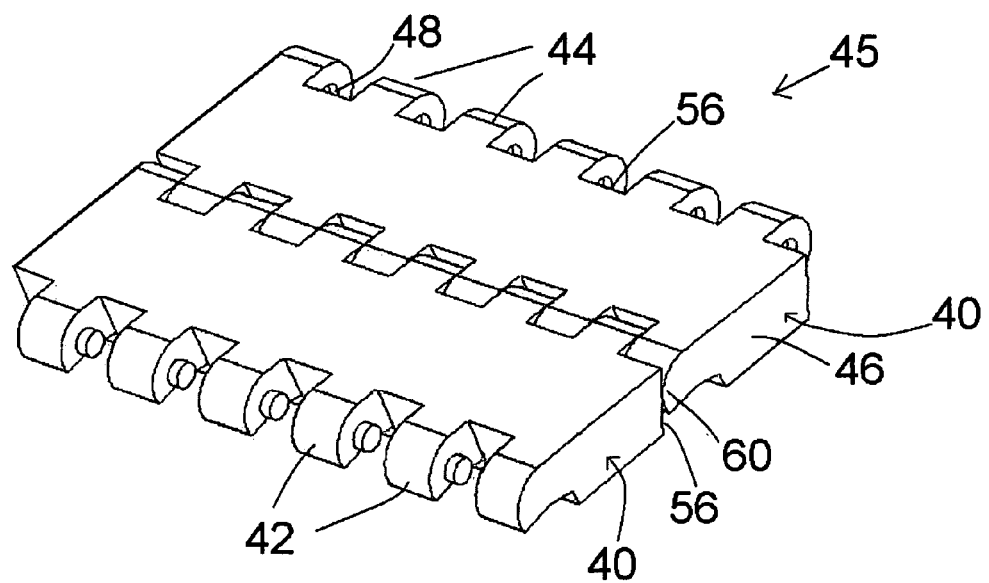
FIG. 6 is a perspective view showing a portion of the same conveyor belt, at an edge of the belt.

A second embodiment of the rodless conveyor belt of the invention is shown in FIGS. 5 through 12. In this form of the invention the modules 40 have first and second groups of link ends or projections 42 and 44 that are not tapered. Again, this is preferably a solid top conveyor belt as shown, for straight travel. The belt portion 45 shown in FIGS. 5 and 6 is for illustration only, and the belt may be assembled in any desired length and a wide variety of widths, as in the above-described embodiment. In FIG. 6 module row ends, to be positioned at an edge of the belt, are shown on the modules 40. In a belt of single-module rows, these closing ends 46 will be present at each module end, but in the typical wider belt, the modules of adjacent rows will be interleaved or "brick-laid" such that joints between laterally adjacent modules are staggered rather than contiguous from row to row.

As seen in the drawings, the non-tapered link ends or projections 42 and 44 are assembled somewhat similarly to the above embodiment, but not utilizing lateral gaps formed via tapering of the projections. Instead, the second set of projections 44 each have slots 48, the upper end of each of which acts as an aperture or recess to seat an integral pivot post 50 extending laterally from a projection of the first set of projections 42. Preferably, but not necessarily, the posts 50 are formed on both sides of each of the first projections 42, with the receiving slots 48 formed on both sides of each of the second projections 44.

Figure 12:
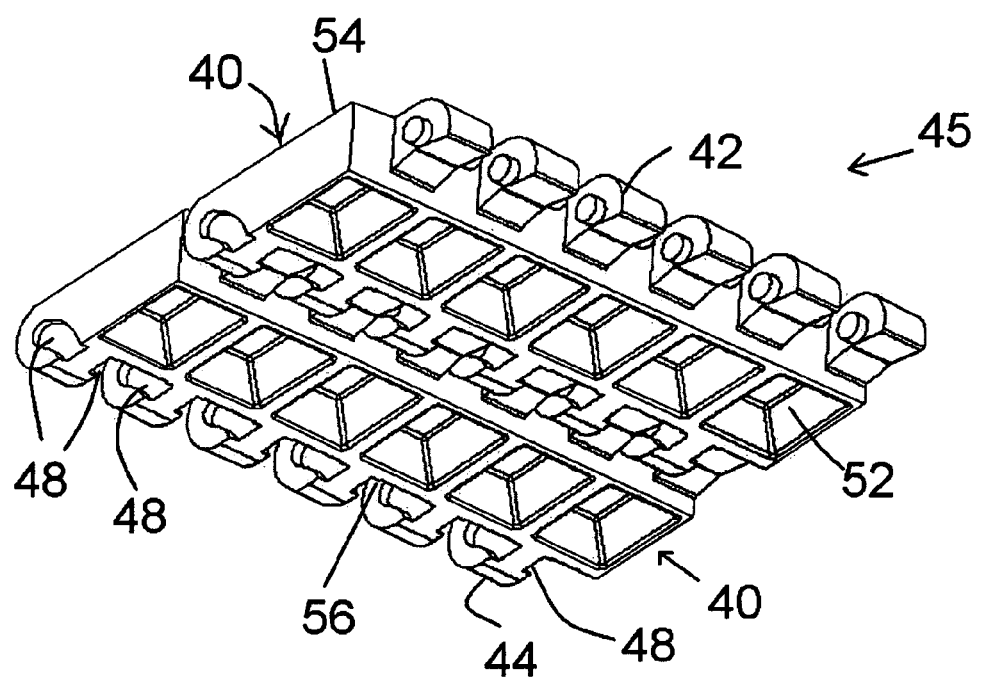
FIG. 12 is a bottom view in perspective, showing a portion of a belt with two modules connected together in planar configuration.

FIG. 12 shows the belt portion 45 in bottom perspective, indicating the preferred open structure of the integrally molded plastic module 40. Thus, deep hollows 52 are molded into the bottom side of the center section 54 of each module. The projections 42 and 44 preferably are solid, except for the slots 48 on each side of the second set of projections 44.

Figure 7:
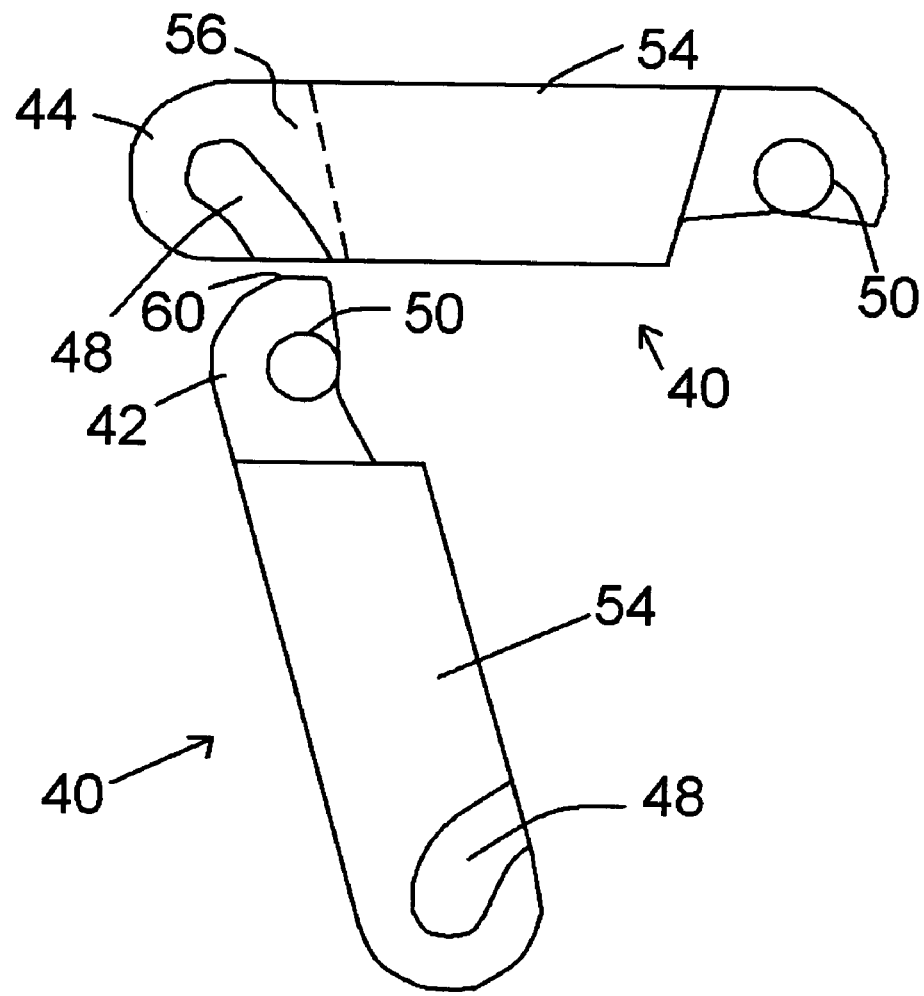
FIG. 7 is a side elevation view, exploded, indicating a module or module row about to be assembled into another module or module row, with the adjacent modules held at an angle for assembly.

FIGS. 7 through 11 indicate the manner of assembly and disassembly of succeeding modules in adjacent module rows. In FIG. 7 a lower module 40 is shown below and in position to be assembled together in interdigited relationship with an upper module 40. The drawing shows in dotted lines a wall 56, also visible in other drawings, that forms a limiting boundary for the position of the first projections 42 as they are moved up toward assembled position. This wall 56, from which the second projections 44 extend, requires that the lower module be oriented at a deep angle, preferably more than ninety degrees as shown, relative to the upper (horizontal) module 4 assembly to take place. The wall 56 would block entry of the pivot post 50 into the slots 48 if orientation were angled more toward the co-planar relationship. At the same time, this wall 56 is in very close proximity to the outer end 60 of the first projections 42 when the modules are fully assembled and co-planar, and this closely positioned relationship can be seen in FIGS. 5, 6 and 12. The slot 48 preferably is curved upwardly and outwardly (toward the forward or aft end of the module), as shown in the drawings. This again helps produce a geometry that provides for convenient assembly and reliable locked connection when the modules are co-planar or pass through the typical angles involved in operation of the belt and travel around sprockets.

Figure 8:
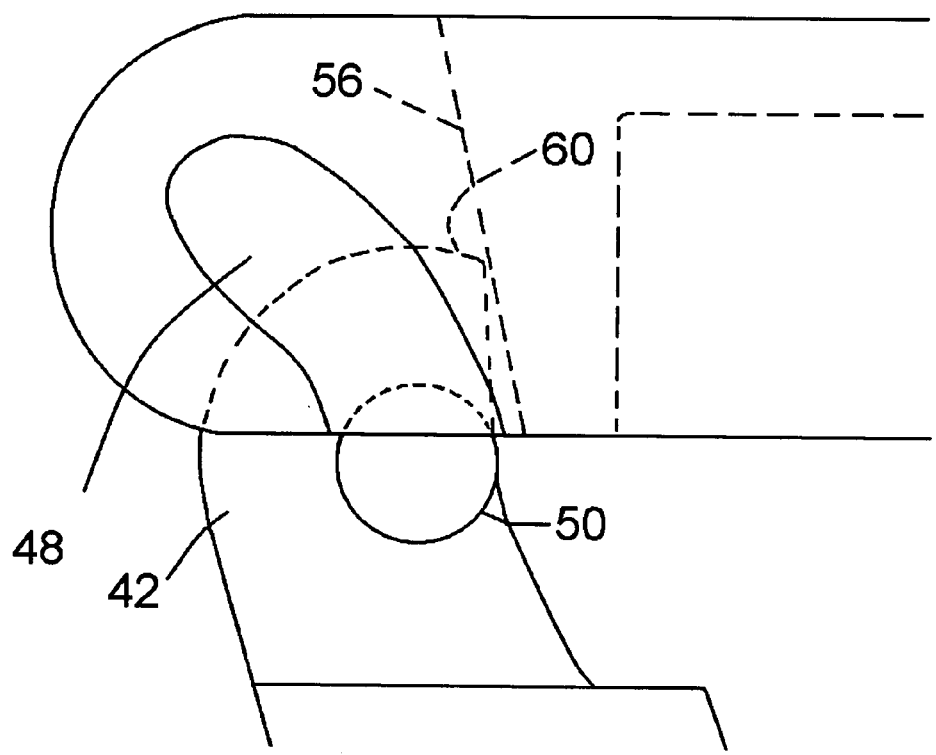
FIG. 8 is an enlarged view showing a portion of FIG. 7, but with the one module being advanced toward the other module such that pivot posts of one module enter slots of the other module.

FIG. 8 shows the modules partially assembled, with the integral pivot posts 50 beginning to enter the slots 48 in the adjacent modules. The tip end 60 of the projection of the first set of projections 42 is very close to the limiting wall 56 on the upper module, shown in dotted lines. The lower module is at a sufficiently sharp angle relative to the upper module that assembly can be made.

Figure 9:
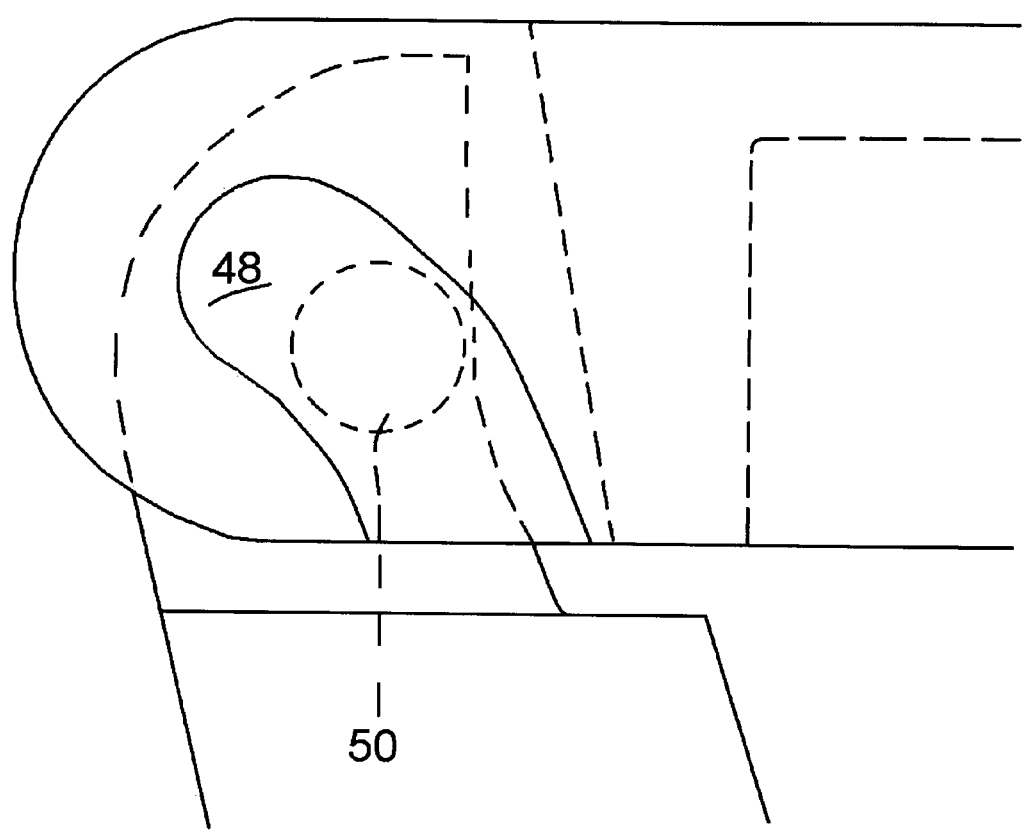
FIG. 9 is a view similar to FIG. 8, showing the one module further advanced toward full assembly with the other module.
Figure 10:
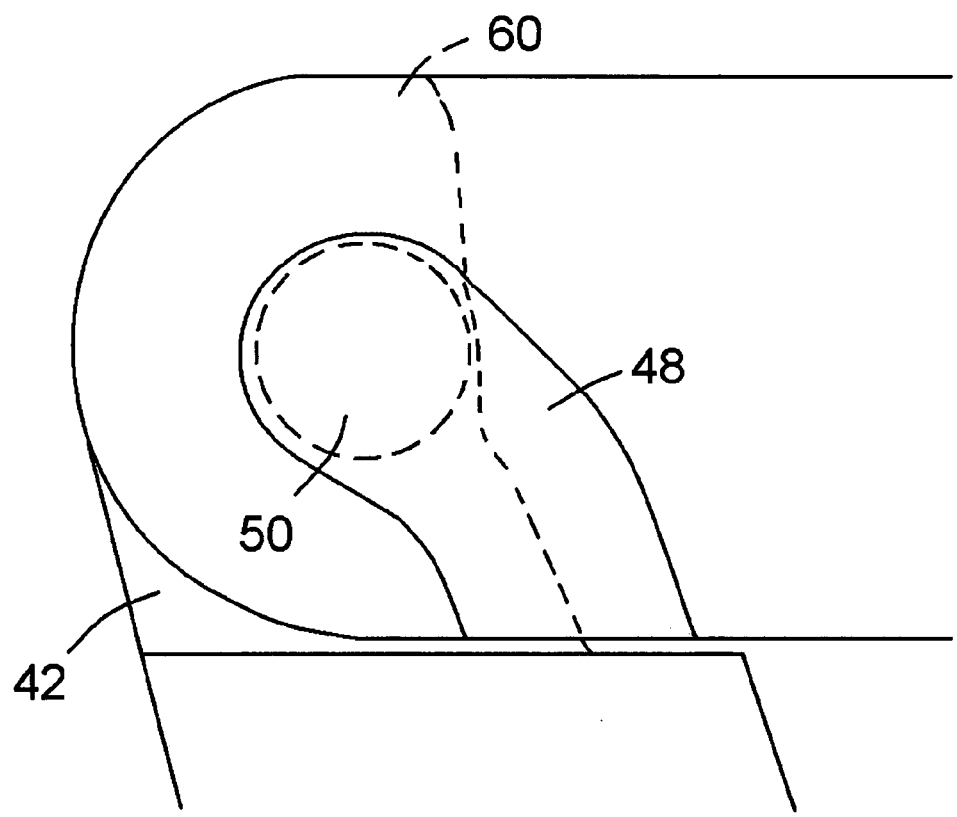
FIG. 10 is another view similar to FIGS. 8 and 9, but showing the modules together with the pivot posts of the one module fully inserted into the slots of the other module, with the modules still held at an assembly angle.

In FIG. 9 the assembly has progressed to the point shown, where the pivot post 50 is about halfway up through the curving slot 48. In FIG. 10 the insertion of the lower module into the upper module, with the projections interdigited, is complete. The lower module has moved upwardly and outwardly relative to the upper module, and it may not be rotated to the co-planar position of the two modules or module rows.

Figure 11:
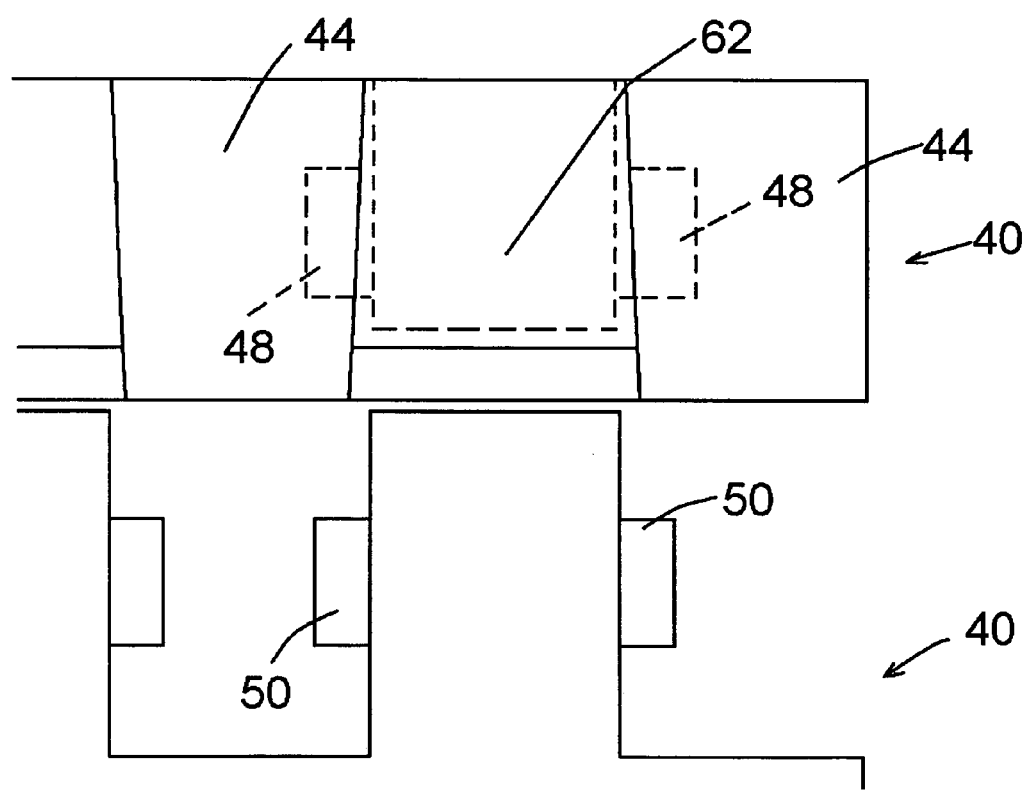
FIG. 11 is an enlarged detail view showing two modules about to be assembled, and showing two pivot posts on each projection of the one module, to enter a pair of slots in projections of the other module.

FIG. 11 shows the two modules 40 in a position which may be approximately that of FIG. 7, indicating the slots 48 at both sides of the projections 44 and that the space 62 between adjacent second projections 44 preferably is tapered slightly, from wider at the bottom to narrower in the upper regions, for positive engagement between the slots 48 and the pivot post 50.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A modular plastic conveyor belt of the type with projections or knuckles extending in fore and aft directions from each module of a multiplicity of modules assembled together, assembly of the belt in a wide variety of widths and lengths, with the projections of adjacent module rows interdigited and retained together along hinge lines, the belt being without connecting rods or pins extending through the interdigited projections, and comprising:

each module having a center section and a plurality of said projections or knuckles extending integrally from the center section in first and second sets that extend in opposite directions from each of two ends of the center section, forward and aft relative to travel of the belt, the projections of the first set having, on each of substantially all such projections, an integral pivot post extending laterally along said hinge line and part way through a space formed with a neighboring projection of the first set, and the projections of the second set having, on each of substantially all such projections, a recess in a lateral side of the projection positioned to be engaged by a pivot post of a projection of the first set, and the projections, pivot posts and recesses being so configured and arranged that to assemble serially adjacent modules together in adjacent module rows, or to disassemble such modules, the modules of the adjacent rows must be angled such that the modules of one row turn down angularly relative to the modules of the adjacent row, until the first projections with pivot posts can interdigit with the second projections and engage the posts in the recesses of the second projections, and such that the modules of the adjacent rows are locked together when returned toward a common planar configuration.

2. A conveyor belt according to claim 1, wherein the projections, pivot posts and recesses are so configured and arranged that to assemble adjacent modules together in adjacent module rows, the module of one row must be rotated through an angle of at least about ninety degrees relative to the module of the adjacent row, and such that the modules of adjacent rows are locked together through angles of zero degrees to at least about ninety degrees.

3. A conveyor belt according to claim 2, wherein the modules must be rotated through an angle of at least about 120°.

4. A conveyor belt according to claim 1, wherein the projections of the first and second sets are tapered, narrowing from top to bottom of the projection, thus providing a gap between the interdigited projections of adjacent modular rows, allowing a preselected amount of relative lateral movement between the modules of adjacent rows when the modules of adjacent rows are angled to an assembly configuration, and wherein the first projections have said pivot posts only on one side of each projection, such that the lateral movement afforded by the deeply angled adjacent modules of adjacent module rows provides clearance for the pivot posts to be moved laterally into alignment with the recesses of the second projections so that the modules can be assembled, said recesses in the second projection comprising generally cylindrical openings.

5. A conveyor belt according to claim 4, wherein the pivot posts have a length relative to the configurations of the projections such that in planar configuration of adjacent rows, the pivot posts extend into the recesses at least about 0.08".

6. A conveyor belt according to claim 4, wherein, when the modules of adjacent rows are rotated to an angle that is sufficient to allow assembly of the adjacent modules, the amount of lateral movement afforded between the interdigited modules is at least about 0.08".

7. A conveyor belt according to claim 4, wherein, when the modules of adjacent rows are rotated to an angle that is sufficient to allow assembly of the adjacent modules, the amount of lateral movement afforded between the interdigited modules is at least about 25% of the maximum width of any projection.

8. A conveyor belt according to claim 4, wherein the conveyor belt comprises a solid top conveyor belt, said center section being substantially closed, and with very small gaps defined between interdigited projections when the modules of adjacent rows are substantially at zero degrees and co-planar.

9. A conveyor belt according to claim 1, wherein the projections of the first and second sets of projections are essentially non-tapered, the projections of the second set each having a slot in a lateral side of the projection, extending from a bottom of the projection upwardly and outwardly toward the end of the projection to an upper slot end positioned to retain a pivot post during operation of the belt, whereby adjacent modules of adjacent module rows can be assembled in the angled position by sliding the pivot post of the first projections of one module up into the slots of the second projections of the other module until the pivot posts reach the upper ends of the slots, then the adjacent modules can be rotated to the normal co-planar configuration.

10. A conveyor belt according to claim 9, wherein the slots are curved.

11. A conveyor belt according to claim 9, wherein the first projections have the pivot posts on both lateral sides, and wherein the slots are formed on both sides of the second projections, in the case of generally all projections.

12. A plastic belt module for use in forming a modular plastic conveyor belt of the type of with projections or knuckles extending in fore and aft directions from each module, for assembling a belt in a wide variety of widths and lengths with the projections of adjacent module rows interdigited and retained together along hinge lines, and such that a belt assembled from such modules is without connecting rods or pins extending through the interdigited projections, the module comprising:

the module having a center section and a plurality of said projections or knuckles extending integrally from the center section in first and second sets that extend in opposite directions from each of two ends of the center section, forward and aft relative to travel of the belt, the projections of the first set having, on each of substantially all such projections, an integral pivot post extending laterally along said hinge line and part way through a space formed with a neighboring projection of the first set, and the projections of the second set having, on each of substantially all such projections, a recess in a lateral side of the projection positioned to be engaged by a pivot post of a projection of the first set, and the projections, pivot posts and recesses being so configured and arranged that to assemble serially adjacent modules together in adjacent module rows, or to disassemble such modules, the modules of the adjacent rows must be angled such that the modules of one row turn down angularly relative to the modules of the adjacent row, until the first projections with pivot posts can interdigit with the second projections and engage the posts in the recesses of the second projections, and such that the modules of the adjacent rows are locked together when returned toward a common planar configuration.

13. A plastic belt module as in claim 12, wherein the projections, pivot posts and recesses are so configured and arranged that to assemble adjacent modules together in adjacent module rows, the module of one row must be rotated through an angle of at least about ninety degrees relative to the module of the adjacent row, and such that the modules of adjacent rows are locked together through angles of zero degrees to at least about ninety degrees.

14. A plastic belt module as in claim 12, wherein the projections of the first and second sets are tapered, narrowing from top to bottom of the projection, thus providing a gap between the interdigited projections of adjacent modular rows, allowing a preselected amount of relative lateral movement between the modules of adjacent rows when the modules of adjacent rows are angled to an assembly configuration, and wherein the first projections have said pivot posts only on one side of each projection, such that the lateral movement afforded by the deeply angled adjacent modules of adjacent module rows provides clearance for the pivot posts to be moved laterally into alignment with the recesses of the second projections so that the modules can be assembled, said recesses in the second projection comprising generally cylindrical openings.

15. A plastic belt module as in claim 14, wherein the pivot posts have a length relative to the configurations of the projections such that in planar configuration of adjacent rows, the pivot posts extend into the recesses at least about 0.08".

16. A plastic belt module as in claim 14, wherein, when the modules of adjacent rows are rotated to an angle that is sufficient to allow assembly of the adjacent modules, the amount of lateral movement afforded between the interdigited modules is at least about 0.08".

17. A plastic belt module as in claim 14, wherein the defined between interdigited projections when the modules of adjacent rows are substantially at zero degrees and co-planar.

18. A plastic belt module as in claim 12, wherein the projections of the first and second sets of projections are essentially non-tapered, the projections of the second set each having a slot in a lateral side of the projection, extending from a bottom of the projection upwardly and outwardly toward the end of the projection to an upper slot end positioned to retain a pivot post during operation of the belt, whereby adjacent modules of adjacent module rows can be assembled in the angled position by sliding the pivot post of the first projections of one module up into the slots of the second projections of the other module until the pivot posts reach the upper ends of the slots, then the adjacent modules can be rotated to the normal co-planar configuration.

19. A plastic belt module as in claim 18, wherein the slots are curved.

20. A plastic belt module as in claim 18, wherein the first projections have the pivot posts on both lateral sides, and wherein the slots are formed on both sides of the second projections, in the case of generally all projections.

* * * * *